US010664148B2

(12) United States Patent
Matas

(10) Patent No.: US 10,664,148 B2
(45) Date of Patent: May 26, 2020

(54) LOADING CONTENT ON ELECTRONIC DEVICE

(71) Applicant: Facebook, Inc., Menlo Park, CA (US)

(72) Inventor: Michael Matas, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 492 days.

(21) Appl. No.: 14/739,938

(22) Filed: Jun. 15, 2015

(65) Prior Publication Data

US 2015/0277691 A1    Oct. 1, 2015

Related U.S. Application Data

(63) Continuation of application No. 13/676,951, filed on Nov. 14, 2012, now Pat. No. 9,081,410.

(51) Int. Cl.
*G06F 3/0485* (2013.01)
*G06F 16/951* (2019.01)
(Continued)

(52) U.S. Cl.
CPC .............. *G06F 3/0485* (2013.01); *G06F 3/00* (2013.01); *G06F 3/04842* (2013.01); *G06F 3/04847* (2013.01); *G06F 16/951* (2019.01)

(58) Field of Classification Search
CPC ........... G06F 17/30424; G06F 9/30032; G06F 9/30043; G06F 9/3885; G06F 9/467; G06F 11/1453; G06F 11/1458; G06F 11/2023; G06F 12/0802; G06F 12/0804; G06F 12/0808; G06F 12/0813; G06F 12/0828; G06F 12/0897; G06F 13/1621; G06F 17/212; G06F 17/2247; G06F 17/248; G06F 17/30563; G06F 1/3203; G06F 21/561; G06F 8/65; G06F 9/30029;
(Continued)

(56) References Cited

U.S. PATENT DOCUMENTS 5,422,993 A    1/1995    Fleming
5,430,494 A    7/1995    Saeger
(Continued)

FOREIGN PATENT DOCUMENTS

EP    2 487 603    8/2012
EP    2 518 646    10/2012
(Continued)

OTHER PUBLICATIONS

Notice of Allowance for U.S. Appl. No. 13/676,658 dated Oct. 13, 2015.
(Continued)

*Primary Examiner* — Maryam M Ipakchi
(74) *Attorney, Agent, or Firm* — Jordan IP Law, LLC

(57) ABSTRACT

In one embodiment, as a user is scrolling through a first series of content items and reaches the nth content items from the first series of content items, display a visual indication that there are additional content items from the first series of content items existing after the nth content item. Upon receiving a first user input, enable the user to scroll through the additional content items existing after the nth content item. Upon receiving a second user input, enable the user to scroll through a second series of content items.

18 Claims, 11 Drawing Sheets

(51) Int. Cl.
*G06F 3/00* (2006.01)
*G06F 3/0484* (2013.01)

(58) Field of Classification Search
CPC ............. G06F 9/30036; G06F 9/30047; G06F 9/30054; G06F 9/383; G06F 9/3897; G06F 9/455; G06F 9/45533; G06F 9/45558
See application file for complete search history.

(56) References Cited

U.S. PATENT DOCUMENTS

| | | |
|---|---|---|
| 5,668,966 A | 9/1997 | Ono |
| 5,692,175 A | 11/1997 | Davies |
| 5,941,626 A | 8/1999 | Yamuro |
| 6,141,018 A | 10/2000 | Beri |
| 6,188,432 B1 | 2/2001 | Ejima |
| 6,252,594 B1 | 6/2001 | Xia |
| 7,109,975 B2 | 9/2006 | Fedorak |
| 7,415,662 B2 | 8/2008 | Rothmuller |
| 7,479,949 B2 | 1/2009 | Jobs |
| 7,555,725 B2 | 6/2009 | Abramson |
| 7,590,947 B1 | 9/2009 | Gay |
| 7,930,646 B2 | 4/2011 | De Souza |
| 7,945,852 B1 | 5/2011 | Pilskalns |
| 8,051,089 B2 | 11/2011 | Gargi |
| 8,131,118 B1 | 3/2012 | Jing |
| 8,176,438 B2 | 5/2012 | Zaman |
| 8,271,907 B2 | 9/2012 | Kim |
| 8,275,394 B2 | 9/2012 | Mattila |
| 8,287,383 B1 | 10/2012 | Etter |
| 8,327,284 B2 | 12/2012 | Marusich |
| 8,327,289 B2 | 12/2012 | Butlin |
| 8,386,935 B2 | 2/2013 | van Zwol |
| 8,429,565 B2 | 4/2013 | Agarawala |
| 8,442,265 B1 | 5/2013 | Bosworth |
| 8,456,488 B2 | 6/2013 | Ubillos |
| 8,464,176 B2 | 6/2013 | Van Dok |
| 8,504,586 B2 | 8/2013 | Armstrong |
| 8,540,570 B2 | 9/2013 | Janis |
| 8,584,015 B2 | 11/2013 | Osten |
| 8,584,027 B2 | 11/2013 | Quennesson |
| 8,621,450 B2 | 12/2013 | Firman |
| 8,667,418 B2 | 3/2014 | Chaudhri |
| 8,677,283 B2 | 3/2014 | Fong |
| 8,683,377 B2 | 3/2014 | Zuverink |
| 8,683,378 B2 | 3/2014 | Bull |
| 8,726,142 B2 | 5/2014 | Piantino |
| 8,745,511 B2 | 6/2014 | Ducharme |
| 8,749,610 B1 | 6/2014 | Gossweiler |
| 8,799,818 B2 | 8/2014 | Kim |
| 8,803,908 B2 | 8/2014 | Van Osten |
| 8,811,771 B2 | 8/2014 | Shechtman |
| 8,830,270 B2 | 9/2014 | Zaman |
| 8,832,188 B1 | 9/2014 | Cierniak |
| 8,843,519 B2 | 9/2014 | Armstrong |
| 8,845,423 B1 | 9/2014 | Monahan |
| 8,892,997 B2 | 11/2014 | Louch |
| 8,898,562 B2 | 11/2014 | Tocchini |
| 8,922,575 B2 | 12/2014 | Garside |
| 8,938,690 B1 | 1/2015 | Khouri |
| 9,047,644 B1 | 6/2015 | Terleski |
| 9,081,410 B2 | 7/2015 | Matas |
| 2002/0145620 A1 | 10/2002 | Smith |
| 2003/0233650 A1 | 12/2003 | Zaner |
| 2004/0095400 A1 | 5/2004 | Anderson |
| 2004/0145593 A1 | 7/2004 | Berkner |
| 2004/0164969 A1 | 8/2004 | Matsuda |
| 2004/0218910 A1 | 11/2004 | Chang |
| 2004/0252120 A1 | 12/2004 | Hunleth |
| 2005/0091596 A1 | 4/2005 | Anthony |
| 2005/0210410 A1 | 9/2005 | Ohwa |
| 2005/0275636 A1 | 12/2005 | Dehlin |
| 2006/0010382 A1 | 1/2006 | Ejiri |
| 2006/0080621 A1 | 4/2006 | Park |
| 2006/0095331 A1 | 5/2006 | O'Malley |
| 2006/0161868 A1 | 7/2006 | Van Dok |
| 2007/0038846 A1 | 2/2007 | Kadambi |
| 2007/0061488 A1 | 3/2007 | Alagappan |
| 2007/0150913 A1 | 6/2007 | Ando |
| 2007/0236475 A1 | 10/2007 | Wherry |
| 2007/0236477 A1 | 10/2007 | Ryu |
| 2008/0009325 A1 | 1/2008 | Zinn |
| 2008/0034381 A1 | 2/2008 | Jalon |
| 2008/0057926 A1 | 3/2008 | Forstall |
| 2008/0064438 A1 | 3/2008 | Calvet |
| 2008/0098316 A1 | 4/2008 | Declan |
| 2008/0098327 A1* | 4/2008 | Berkovitz ............. G06F 3/0481 715/803 |
| 2008/0133526 A1 | 6/2008 | Haitani |
| 2008/0165153 A1 | 7/2008 | Platzer |
| 2008/0168349 A1 | 7/2008 | Lamiraux |
| 2008/0168384 A1 | 7/2008 | Platzer |
| 2008/0168402 A1 | 7/2008 | Blumenberg |
| 2008/0270886 A1 | 10/2008 | Gossweiler |
| 2008/0276269 A1 | 11/2008 | Miller |
| 2008/0282202 A1 | 11/2008 | Sunday |
| 2008/0294663 A1 | 11/2008 | Heinley |
| 2008/0307360 A1 | 12/2008 | Chaudhri |
| 2009/0007017 A1 | 1/2009 | Anzures |
| 2009/0031232 A1 | 1/2009 | Brezina |
| 2009/0044133 A1 | 2/2009 | Goto |
| 2009/0063995 A1 | 3/2009 | Baron |
| 2009/0064031 A1 | 3/2009 | Bull |
| 2009/0064055 A1 | 3/2009 | Chaudhri |
| 2009/0106687 A1 | 4/2009 | De Souza |
| 2009/0132921 A1 | 5/2009 | Hwangbo |
| 2009/0132933 A1 | 5/2009 | Faski |
| 2009/0144392 A1 | 6/2009 | Wang |
| 2009/0164602 A1 | 6/2009 | Kies |
| 2009/0196510 A1 | 8/2009 | Gokturk |
| 2009/0198359 A1 | 8/2009 | Chadhri |
| 2009/0199082 A1 | 8/2009 | Hollander |
| 2009/0228807 A1* | 9/2009 | Lemay ................. G06F 3/04817 715/752 |
| 2009/0231271 A1 | 9/2009 | Heubel |
| 2009/0281988 A1 | 11/2009 | Yoo |
| 2009/0305732 A1 | 12/2009 | Marcellino |
| 2009/0307623 A1 | 12/2009 | Agarawala |
| 2009/0312033 A1 | 12/2009 | Shen |
| 2009/0325607 A1 | 12/2009 | Conway |
| 2010/0049534 A1 | 2/2010 | Whitnah |
| 2010/0058226 A1 | 3/2010 | Flake |
| 2010/0058240 A1 | 3/2010 | Bull |
| 2010/0070628 A1 | 3/2010 | Harrang |
| 2010/0158315 A1 | 6/2010 | Martin |
| 2010/0162140 A1 | 6/2010 | Fereira |
| 2010/0162174 A1 | 6/2010 | Karidi |
| 2010/0179874 A1 | 7/2010 | Higgins |
| 2010/0199180 A1 | 8/2010 | Brichter |
| 2010/0211872 A1 | 8/2010 | Rolston |
| 2010/0214321 A1 | 8/2010 | Hokkanen |
| 2010/0274815 A1 | 10/2010 | Vanasco |
| 2010/0275152 A1 | 10/2010 | Atkins |
| 2010/0281409 A1 | 11/2010 | Rainisto |
| 2010/0313165 A1 | 12/2010 | Louch |
| 2010/0332958 A1 | 12/2010 | Weinberger |
| 2011/0010641 A1 | 1/2011 | Wolff |
| 2011/0083082 A1 | 4/2011 | Gottwald |
| 2011/0084962 A1 | 4/2011 | Kim |
| 2011/0090255 A1* | 4/2011 | Wilson ................. G06F 3/04817 345/647 |
| 2011/0093812 A1 | 4/2011 | Fong |
| 2011/0125846 A1 | 5/2011 | Hamana |
| 2011/0126156 A1 | 5/2011 | Krishnaraj |
| 2011/0145753 A1 | 6/2011 | Prakash |
| 2011/0157188 A1 | 6/2011 | Nakagawa |
| 2011/0164058 A1 | 7/2011 | Lemay |
| 2011/0182485 A1 | 7/2011 | Shochat |
| 2011/0184772 A1 | 7/2011 | Norton |
| 2011/0184960 A1 | 7/2011 | Delphia |
| 2011/0191685 A1 | 8/2011 | Bamford |
| 2011/0196923 A1 | 8/2011 | Marcucci |
| 2011/0202866 A1 | 8/2011 | Huang |

(56) References Cited

U.S. PATENT DOCUMENTS

| | | |
|---|---|---|
| 2011/0231745 A1 | 9/2011 | Levesque |
| 2011/0231802 A1 | 9/2011 | Lee |
| 2011/0238690 A1 | 9/2011 | Arrasvuori |
| 2011/0258575 A1 | 10/2011 | Cupp |
| 2011/0276396 A1 | 11/2011 | Rathod |
| 2011/0307631 A1 | 12/2011 | Park |
| 2012/0010995 A1 | 1/2012 | Skirpa |
| 2012/0011430 A1 | 1/2012 | Parker |
| 2012/0016858 A1 | 1/2012 | Rathod |
| 2012/0023407 A1 | 1/2012 | Taylor |
| 2012/0023425 A1 | 1/2012 | Hackborn |
| 2012/0030568 A1 | 2/2012 | Migos |
| 2012/0030616 A1 | 2/2012 | Howes |
| 2012/0030636 A1 | 2/2012 | Miyazaki |
| 2012/0054684 A1 | 3/2012 | Gossweiler |
| 2012/0066304 A1 | 3/2012 | Marmon |
| 2012/0072957 A1 | 3/2012 | Cherukuwada |
| 2012/0096393 A1 | 4/2012 | Shim |
| 2012/0105489 A1 | 5/2012 | Monroe |
| 2012/0110474 A1 | 5/2012 | Chen |
| 2012/0113095 A1 | 5/2012 | Hwang |
| 2012/0131508 A1* | 5/2012 | Lee .................... G06F 3/0482 715/835 |
| 2012/0143701 A1 | 6/2012 | Reis |
| 2012/0147055 A1 | 6/2012 | Pallakoff |
| 2012/0154444 A1 | 6/2012 | Fernandez |
| 2012/0159635 A1 | 6/2012 | He |
| 2012/0167010 A1 | 6/2012 | Campbell |
| 2012/0169774 A1 | 7/2012 | Yu |
| 2012/0173994 A1 | 7/2012 | Ho |
| 2012/0179969 A1 | 7/2012 | Lee |
| 2012/0212668 A1 | 8/2012 | Schultz |
| 2012/0223951 A1 | 9/2012 | Dunn |
| 2012/0240071 A1 | 9/2012 | Park |
| 2012/0249571 A1 | 10/2012 | Houjou |
| 2012/0278755 A1 | 11/2012 | Lehmann |
| 2012/0314912 A1 | 12/2012 | Nakagomi |
| 2012/0331053 A1 | 12/2012 | Dunn |
| 2013/0060744 A1 | 3/2013 | Roychoudhuri |
| 2013/0073970 A1 | 3/2013 | Piantino |
| 2013/0080881 A1 | 3/2013 | Goodspeed |
| 2013/0095857 A1 | 4/2013 | Garcia |
| 2013/0097566 A1 | 4/2013 | Berglund |
| 2013/0111391 A1 | 5/2013 | Penner |
| 2013/0111395 A1* | 5/2013 | Ying ................... G06F 3/0483 715/783 |
| 2013/0139111 A1 | 5/2013 | Grimes |
| 2013/0141456 A1 | 6/2013 | Sokolov |
| 2013/0179504 A1 | 7/2013 | Adams |
| 2013/0187944 A1 | 7/2013 | Hamana |
| 2013/0191711 A1 | 7/2013 | Tashman |
| 2013/0271471 A1 | 10/2013 | Schorsch |
| 2013/0321444 A1 | 12/2013 | Efrati |
| 2013/0326398 A1 | 12/2013 | Zuverink |
| 2013/0332068 A1 | 12/2013 | Kesar |
| 2014/0040774 A1 | 2/2014 | Charytoniuk |
| 2014/0074471 A1 | 3/2014 | Sankar |
| 2014/0074652 A1 | 3/2014 | Wu |
| 2014/0089816 A1 | 3/2014 | DiPersia |
| 2014/0115446 A1 | 4/2014 | Hall |
| 2014/0123021 A1 | 5/2014 | Walkin |
| 2014/0123081 A1 | 5/2014 | Park |
| 2014/0132638 A1 | 5/2014 | Matas |
| 2014/0136946 A1 | 5/2014 | Matas |
| 2014/0136959 A1 | 5/2014 | Matas |
| 2014/0136968 A1 | 5/2014 | Matas |
| 2014/0136995 A1 | 5/2014 | Matas |
| 2014/0137010 A1 | 5/2014 | Matas |
| 2014/0137011 A1 | 5/2014 | Matas |
| 2014/0137012 A1 | 5/2014 | Matas |
| 2014/0137013 A1 | 5/2014 | Matas |
| 2014/0137026 A1 | 5/2014 | Matas |
| 2014/0137030 A1 | 5/2014 | Matas |
| 2014/0137043 A1 | 5/2014 | Matas |
| 2014/0137046 A1 | 5/2014 | Matas |
| 2014/0344471 A1 | 11/2014 | Valko |
| 2014/0344716 A1 | 11/2014 | Martin |
| 2015/0040035 A1 | 2/2015 | Neelakant |
| 2015/0277691 A1 | 10/2015 | Matas |

FOREIGN PATENT DOCUMENTS

| | | |
|---|---|---|
| KR | 10-2001-0013878 | 2/2001 |
| KR | 10-2004-0073180 | 8/2004 |
| KR | 10-2012-0048522 | 5/2012 |
| WO | 2010/040201 | 4/2010 |
| WO | 2012/001637 | 1/2012 |
| WO | 2012/125426 | 9/2012 |
| WO | 2012/129336 | 9/2012 |

OTHER PUBLICATIONS

Notice of Allowance for U.S. Appl. No. 13/676,658 dated Sep. 28, 2015.
Notice of Allowance for U.S. Appl. No. 13/676,658 dated Sep. 10, 2015.
Response to Non-Final Office Action for U.S. Appl. No. 13/676,658 dated May 26, 2015.
Non-Final Office Action for U.S. Appl. No. 13/676,658 dated Feb. 25, 2015.
Notice of Allowance for U.S. Appl. No. 13/676,831 dated Jul. 22, 2015.
Response to Non-Final Office Action for U.S. Appl. No. 13/676,832 dated May 18, 2015.
Non-Final Office Action for U.S. Appl. No. 13/676,831 dated Mar. 4, 2015.
Notice of Allowance for U.S. Appl. No. 13/663,229 dated Oct. 9, 2015.
Response to Final Office Action for U.S. Appl. No. 13/663,229 dated Apr. 21, 2015.
Final Office Action for U.S. Appl. No. 13/663,229 dated Jan. 26, 2015.
Response to Non-Final Office Action for U.S. Appl. No. 13/663,229 dated Oct. 3, 2014.
Non-Final Office Action for U.S. Appl. No. 13/663,229 dated Jun. 3, 2014.
Response to Final Office Action for U.S. Appl. No. 13/663,229 dated Mar. 25, 2014.
Supplemental Response for U.S. Appl. No. 13/663,229 dated Mar. 20, 2014.
Final Office Action for U.S. Appl. No. 13/663,229 dated Sep. 25, 2013.
Response to Non-Final Office Action for U.S. Appl. No. 13/663,229 dated Aug. 12, 2013.
Non-Final Office Action for U.S. Appl. No. 13/663,229 dated Mar. 12, 2013.
Non-Final Office Action for U.S. Appl. No. 13/677,002 dated Sep. 24, 2015.
Response to Final Office Action for U.S. Appl. No. 13/677,002 dated Sep. 3, 2015.
Final Office Action for U.S. Appl. No. 13/677,002 dated Apr. 30, 2015.
Response to Non-Final Office Action for U.S. Appl. No. 13/677,002 dated Dec. 29, 2014.
Non-Final Office Action for U.S. Appl. No. 13/677,002 dated Jan. 6, 2014.
Response to Final Office Action for U.S. Appl. No. 13/677,002 dated Oct. 3, 2014.
Final Office Action for U.S. Appl. No. 13/677,002 dated May 22, 2014.
Response to Non-Final Office Action for U.S. Appl. No. 13/677,002 dated Feb. 6, 2014.
Non-Final Office Action for U.S. Appl. No. 13/677,002 dated Nov. 6, 2013.
Response to Final Office Action for U.S. Appl. No. 13/677,056 dated Oct. 29, 2015.
Final Office Action for U.S. Appl. No. 13/677,056 dated Jun. 10, 2015.

(56) References Cited

OTHER PUBLICATIONS

Response to Non-Final Office Action for U.S. Appl. No. 13/677,056 dated Mar. 20, 2015.
Non-Final Office Action for U.S. Appl. No. 13/677,056 dated Dec. 12, 2014.
Notice of Allowance for U.S. Appl. No. 13/676,951 dated May 28, 2015.
Notice of Allowance for U.S. Appl. No. 13/676,951 dated Apr. 23, 2015.
Notice of Allowance for U.S. Appl. No. 13/676,951 dated Mar. 5, 2015.
Response to Final Office Action for U.S. Appl. No. 13/676,951 dated Feb. 12, 2015.
Final Office Action for U.S. Appl. No. 13/676,951 dated Feb. 23, 2014.
Response to Non-Final Office Action for U.S. Appl. No. 13/676,951 dated Nov. 6, 2014.
Non-Final Office Action for U.S. Appl. No. 13/676,951 dated Aug. 5, 2014.
Response to Final Office Action for U.S. Appl. No. 13/676,951 dated Apr. 4, 2014.
Final Office Action for U.S. Appl. No. 13/676,951 dated Dec. 4, 2013.
Response to Non-Final Office Action for U.S. Appl. No. 13/676,951 dated Sep. 18, 2013.
Non-Final Office Action for U.S. Appl. No. 13/676,951 dated Apr. 18, 2013.
Final Office Action for U.S. Appl. No. 13/677,222 dated Sep. 17, 2015.
Response to Non-Final Office Action for U.S. Appl. No. 13/677,222 dated Jun. 24, 2015.
Non-Final Office Action for U.S. Appl. No. 13/677,222 dated Mar. 27, 2015.
Final Office Action for U.S. Appl. No. 13/677,166 dated Sep. 17, 2015.
Response to Non-Final Office Action for U.S. Appl. No. 13/677,166 dated Jun. 24, 2015.
Non-Final Office Action for U.S. Appl. No. 13/677,166 dated Mar. 27, 2015.
Non-Final Office Action for U.S. Appl. No. 13/677,104 dated Sep. 24, 2015.
Response to Final Office Action for U.S. Appl. No. 13/677,104 dated Jul. 27, 2015.
Final Office Action for U.S. Appl. No. 13/677,104 dated Mar. 27, 2015.
Response to Non-Final Office Action for U.S. Appl. No. 13/677,104 dated Feb. 12, 2015.
Non-Final Office Action for U.S. Appl. No. 13/677,104 dated Dec. 10, 2014.
Response to Final Office Action for U.S. Appl. No. 13/677,266 dated Oct. 28, 2015.
Final Office Action for U.S. Appl. No. 13/677,266 dated May 26, 2015.
Response to Non-Final Office Action for U.S. Appl. No. 13/677,266 dated Mar. 20, 2015.
Non-Final Office Action for U.S. Appl. No. 13/677,266 dated Dec. 22, 2014.
Final Office Action for U.S. Appl. No. 13/677,269 dated Sep. 10, 2015.
Response to Non-Final Office Action for U.S. Appl. No. 13/677,269 dated Jun. 9, 2015.
Non-Final Office Action for U.S. Appl. No. 13/677,269 dated Mar. 13, 2015.
Final Office Action for U.S. Appl. No. 13/677,247 dated Jun. 5, 2015.
Response to Non-Final Office Action for U.S. Appl. No. 13/677,247 dated May 18, 2015.
Non-Final Office Action for U.S. Appl. No. 13/677,247 dated Mar. 3, 2015.
Response to Final Office Action for U.S. Appl. No. 13/677,274 dated Oct. 1, 2015.
Final Office Action for U.S. Appl. No. 13/677,274 dated Apr. 7, 2015.
Response to Non-Final Office Action for U.S. Appl. No. 13/677,274 dated Dec. 22, 2014.
Non-Final Office Action for U.S. Appl. No. 13/677,274 dated Dec. 22, 2014.
Notice of Allowance for U.S. Appl. No. 13/677,256 dated Sep. 21, 2015.
Supplemental Response for U.S. Appl. No. 13/677,256 dated Sep. 8, 2015.
Response to Non-Final Office Action for U.S. Appl. No. 13/677,256 dated Jul. 8, 2015.
Non-Final Office Action for U.S. Appl. No. 13/677,256 dated Mar. 30, 2015.
International Search Report and Written Opinion for International Applications No. PCT/US2013/067226 dated Feb. 10, 2014.
International Search Report and Written Opinion for International Applications No. PCT/US2013/067482 dated Feb. 19, 2014.
International Search Report and Written Opinion for International Applications No. PCT/US2013/067650 dated Feb. 19, 2014.
International Search Report and Written Opinion for International Applications No. PCT/US2013/068294 dated Feb. 26, 2014.
International Search Report and Written Opinion for International Applications No. PCT/US2013/067925 dated Feb. 19, 2014.
International Search Report and Written Opinion for International Applications No. PCT/US2013/068303 dated Feb. 13, 2015.
International Search Report and Written Opinion for International Applications No. PCT/US2013/068308 dated Feb. 13, 2014.
International Search Report for International Applications No. PCT/US2013/066289 dated Feb. 3, 2014.
"Ken Burns Effect," Wikipedia, http://en.wikipedia.org/w/index.php?title=Ken_Burns_effect&printable=yes (downloaded Sep. 18, 2012) Nov. 14, 2012.
White, Panning and Zooming in Premiere Pro CS5, Dec. 10, 2010, http://www.youtube.com/watch?v=_Okt60VAyb8, Mar. 4, 2015.

\* cited by examiner

LOADING CONTENT ON ELECTRONIC DEVICE

PRIORITY

This application is a continuation under 35 U.S.C. § 120 of U.S. patent application Ser. No. 13/676,951, filed 14 Nov. 2012.

TECHNICAL FIELD

This disclosure generally relates to a user interface.

BACKGROUND

A user interface (UI), in the industrial design field of human-machine interaction, is the space where interactions between humans and machines occur. The goal of the interactions between a human, often referred to as a "user", and a machine at the user interface is the user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

SUMMARY OF PARTICULAR EMBODIMENTS

In particular embodiments, a user interface for presenting content to users may have a hierarchical structure. The user interface may have any number of content sections, and each content section may have any number of content items. The content items may be of any type or format. A user may consume or interact with some of the content items. In particular embodiments, each content item may correspond to a user-interface element.

In particular embodiments, the content sections may be arranged and displayed sequentially. For each content section, the content items belonging to that section may also be arranged and displayed sequentially. This enables a user to view the content section by section and item by item. For example, the user may select a content section and then scroll through the content items belonging to that section (i.e., the currently selected section) to view the individual items. When done with the current content section, the user may select another content section and then similarly scroll through the content items belonging to that section to view the individual items.

In particular embodiments, initially, a limited number of content items from each content section are loaded (e.g., on an electronic device) so that they are ready to be displayed. A user may select a content section and then scroll through the already loaded content items to view them one item at a time.

In particular embodiments, while scrolling through the content items of the currently selected content section, when the user reaches the last content item of the current content section that has already been loaded, as the user moves the last already loaded content item of the current content section across the screen (e.g., towards the left of the screen), between the last already loaded content item of the current content section and the first already loaded content item of the next content section, a visual indication (e.g., a stack of folded pages, a button) is displayed to inform the user that there are more content items in the current content section that can be loaded and displayed. The user may choose to load and view additional content items from the current content section or move onto the next content section. If the user chooses to load more content items from the current content section (e.g., by selecting the button), more content items from the current content section are loaded and displayed to the user. Otherwise, the already loaded content items from the next content section are displayed to the user. This process may be repeated whenever the user reaches the last content item of the current content section that has already been loaded.

DESCRIPTION OF EXAMPLE EMBODIMENTS

A user interface (UI) may be incorporated into any type of software applications, including, for example, desktop applications, mobile applications, or web-based applications, to enable users to interact with and control the applications. A graphical user interface (GUI) is a type of user interface that enables users to interact with software applications through multi-media objects, including, for example, icons, buttons, menus, images, video, or audios.

Figure 1:
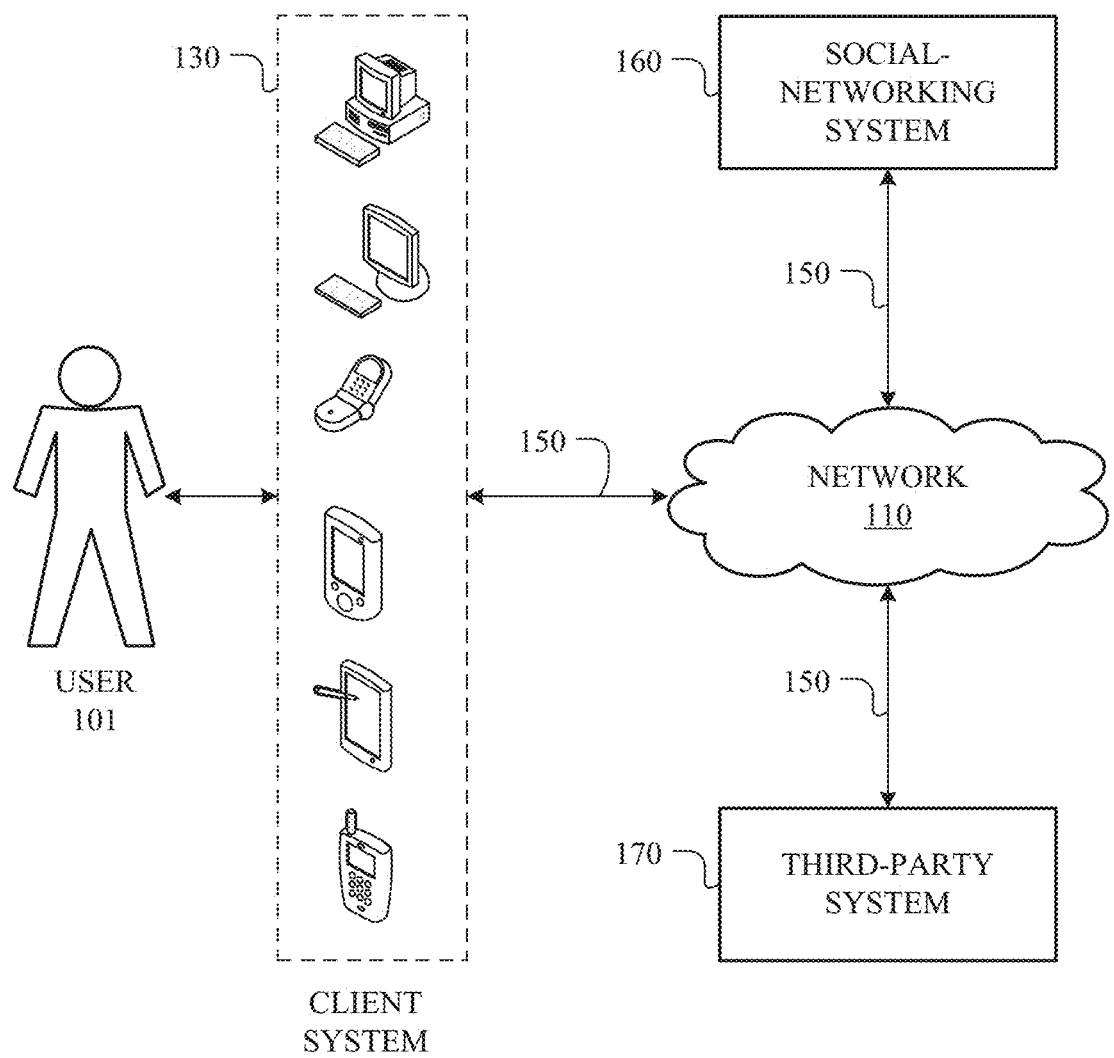
FIG. 1 illustrates an example network environment associated with a social-networking system.

In particular embodiments, a software application may be associated with a social-networking system. FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various third-party software applications (e.g., web-based applications). Third-party system 170 may generate, store, receive, and transmit various types of data, such as, for example, texts, images, videos, or audios. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, data (e.g., data representing various types of information or content) may be sent between servers associated with social-networking system 160 and individual client systems 130 via network 110. When two electronic devices (e.g., a server and a client) are connected to a network (e.g., a computer or communications network, such as network 110), data may be transmitted between the two devices over the network using one or more suitable network protocols. A network may include any number of sub-networks. By transmitting data between the two devices, the two devices may communicate with each other.

In network communications, there are two ways to send a communication (i.e., data) from one device to another device: push and pull. With push technology, the request for the communication transaction is initiated by the sending device. That is, the sending device "pushes" the communication, so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication, so to speak, from the sending device. In this case, the sending device may be considered the passive party and the receiving device may be considered the active party in the transaction. In particular embodiments, a server associated with social-networking system 160 may push data to a client system 130. A communication pushed from a server to a client may be referred to as a "push notification". Similarly, a client system 130 may push data to a server associated with social-networking system 160.

In particular embodiments, a client system 130 may be a mobile electronic or computing device. A mobile electronic device—such as a Smartphone, tablet computer, or laptop computer—may include functionality for determining its location, direction, or orientation, such as a GPS receiver, compass, or gyroscope. Such a mobile device may also include functionality for wireless communication, such as BLUETOOTH communication, near-field communication (NFC), or infrared (IR) communication or communication with a wireless local area networks (WLANs) or cellular-telephone network. Such a mobile device may also include one or more cameras, scanners, touchscreens, microphones, or speakers. Mobile electronic devices may also execute software applications, such as games, web browsers, or social-networking applications. With social-networking applications, users may connect, communicate, and share information with other users in their social networks.

Figure 2A:
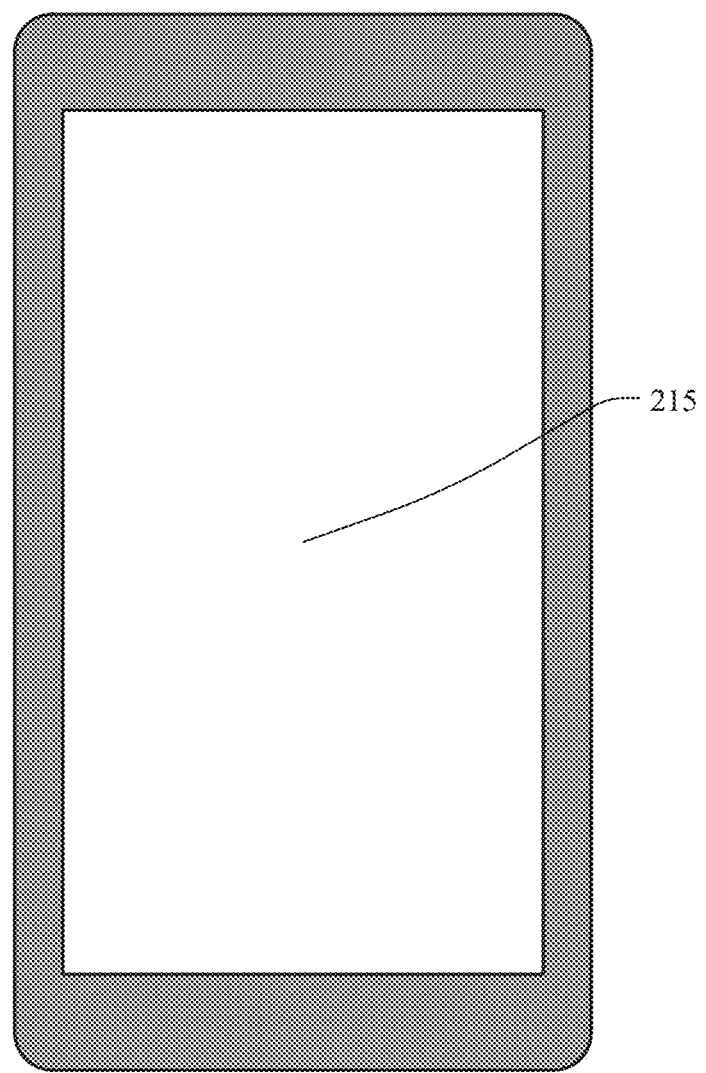
FIGS. 2A and 2B illustrate two example mobile electronic devices.

In particular embodiments, a mobile electronic device (e.g., Smartphone or tablet computer) may include a touchscreen capable of receiving touch input. FIG. 2A illustrates an example mobile electronic device 210 (e.g., a Smartphone) having a touchscreen 215. Touchscreen 215 may incorporate one or more touch sensors and a touch-sensor controller for detecting the presence and location of a touch (e.g., from a user's finger) or the proximity of an object (e.g., a stylus). In particular embodiments, a specific touch detected via touchscreen 215 may result in a touch input event.

Figure 2B:
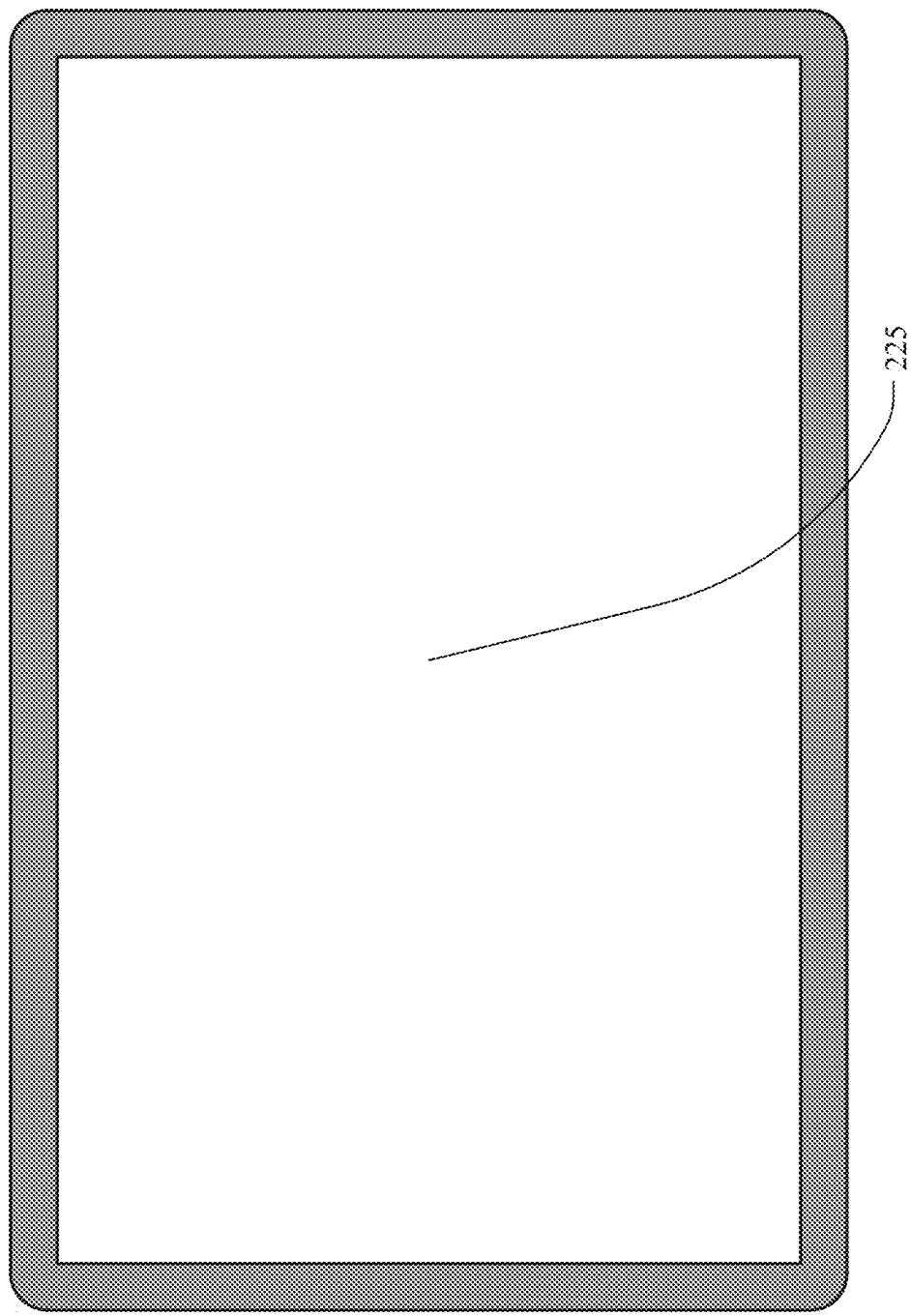

Different mobile electronic devices may have different designs. As a result, the size, shape, or aspect ratio of the touchscreens of different mobile devices may differ. FIG. 2B illustrates another example mobile electronic device 220

(e.g., a tablet computer) having a touchscreen 225. Similarly, touchscreen 225 may incorporate one or more touch sensors and a touch-sensor controller for detecting the presence and location of a touch (e.g., from a user's finger) or the proximity of an object (e.g., a stylus). A specific touch detected via touchscreen 225 may result in a touch input event. However, since mobile electronic devices 210 and 220 are two different types of devices, their respective touchscreen 215 and 225 have different sizes and aspect ratios.

There may be various types of touches or gestures, such as single tap, double tap, short press, long press, slide, swipe, flip, pinch open, or pinch close, corresponding to various types of touch input events. Different touch input events may result in different responses and this disclosure contemplates any applicable gesture.

Social-networking system 160 may store various types of data including, for example, user data, application data, or social data. In particular embodiments, such data may be stored in a graph having any number of nodes and edges, where each edge connects two nodes. The graph is often referred to as a "social graph" or "open graph" as it contains, among others, social information.

Figure 3:
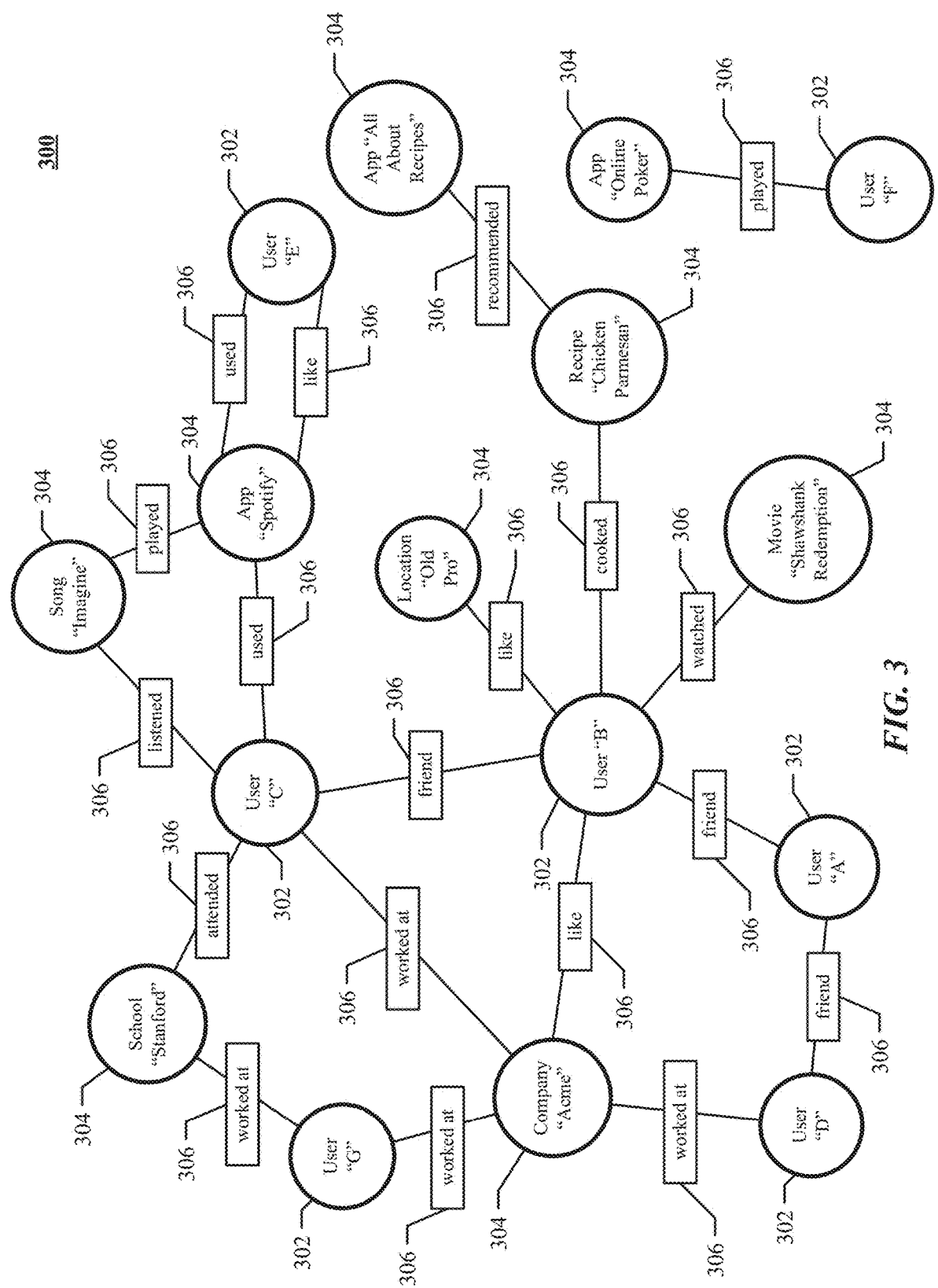
FIG. 3 illustrates an example social graph.

FIG. 3 illustrates example social graph 300. In particular embodiments, social-networking system 160 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 160, client system 130, or third-party system 170 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 160. In particular embodiments, a user node 302 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages.

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to one or more webpages.

In particular embodiments, a node in social graph 300 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat"

edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 306 connecting the first user's user node 302 to the second user's user node 302 in social graph 300 and store edge 306 as social-graph information in one or more of data stores (e.g., data stores associated with social-networking system 160). In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 160 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 160 may create an edge 306 between a user node 302 and a concept node 304 in social graph 300. As an example and not by way of limitation, a user viewing a concept-profile page (such as, for example, by using a web browser or a special-purpose application hosted by the user's client system 130) may indicate that he or she likes the concept represented by the concept node 304 by clicking or selecting a "Like" icon, which may cause the user's client system 130 to transmit to social-networking system 160 a message indicating the user's liking of the concept associated with the concept-profile page. In response to the message, social-networking system 160 may create an edge 306 between user node 302 associated with the user and concept node 304, as illustrated by "like" edge 306 between the user and concept node 304. In particular embodiments, social-networking system 160 may store an edge 306 in one or more data stores. In particular embodiments, an edge 306 may be automatically formed by social-networking system 160 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

In particular embodiments, a set of objects may be organized into a hierarchy based on, for example, how the individual objects are related to each other. An object hierarchy may have any number of levels, and at each level, there may be any number of objects. Parent-child or sibling relationships may exist between specific objects in the hierarchy. Within an object hierarchy, a parent object is one level above the level of its child objects. Two sibling objects are at the same level and share the same parent object. In addition, any portion of the hierarchy may also be considered a hierarchy in itself.

Figure 4:
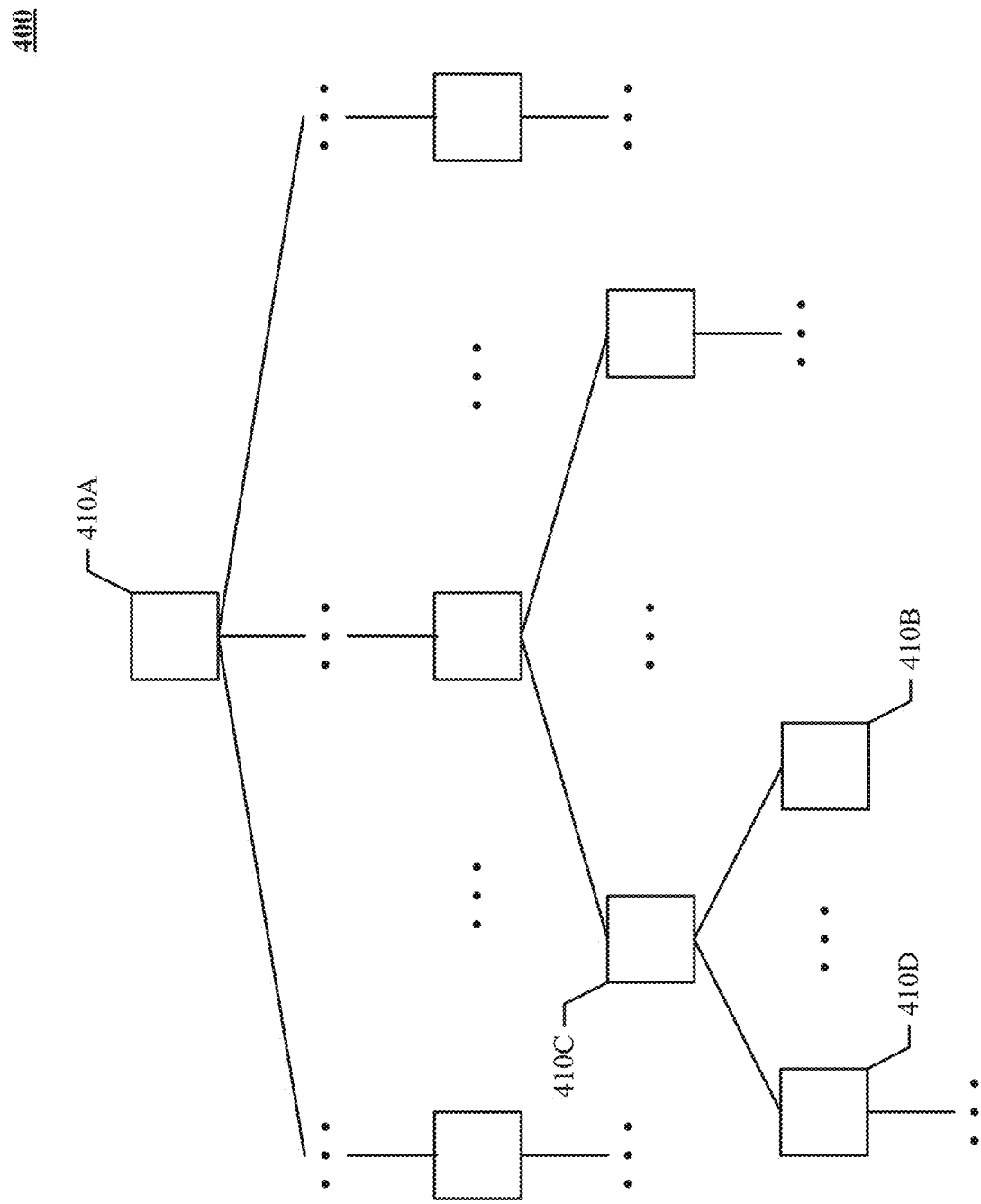
FIG. 4 illustrates an example object hierarchy.

FIG. 4 illustrates a portion of an example object hierarchy 400 that includes a number of objects 410. FIG. 4 is in fact a visual representation of an object hierarchy. Each node represents a specific object in the hierarchy, and each edge connecting two nodes represents a parent-child relationship between the two corresponding objects.

In particular embodiments, an object in a hierarchy may or may not have a parent. If an object does not have a parent, it may be referred to as a "root" object (e.g., object 410A). Typically, the root object is positioned at the first or topmost level of the hierarchy. In particular embodiments, an object in a hierarchy may or may not have any children. If an object does not have any children, it may be referred to as a "leaf" or "terminal" object (e.g., object 410B). If an object does have children (e.g., object 410C), it may have any number of children. In addition, objects sharing the same parent may be referred to as each other's "siblings". For example, in FIG. 4, object 410C is the parent of objects 410D and 410B. Objects 410D and 410B are the children of object 410C and are siblings to each other. Thus, a hierarchy of objects (e.g., object hierarchy 400) not only includes the individual objects (e.g., objects 410) themselves but also indicates the relationships among the specific objects. Moreover, the position of a specific object within the hierarchy may indicate its relationships with other objects in the hierarchy.

Objects 410 may be of various types, and this disclosure contemplates any applicable object types. For example and without limitation, the term "object" may refer to any type of content, including but not limited to images, videos, captions, text blocks or boxes, user-interface elements, clickable links, newsfeed stories, references to other objects, advertisements, calendar events, units for displaying open graph analysis that may be graphically rendered, applications, websites, web pages, books, chapters. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface or how the objects are presented to a user.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or other content or media elements on each page. Each of these also corresponds to an object (e.g., user-interface component) in the hierarchy. More specifically, within the hierarchy, the digital book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or other content or media elements on that page. A text block, image, video, audio, or other content or media element is one of the child objects of the page to which it belongs. Similarly, for a software application that manages news feeds, its components may include the individual news channels and the news stories within each channel. Each of these may correspond to an object. Within the hierarchy, the news-feed application, while itself being one of the child objects of the desktop, is also the parent object of the news channels. A news channel in turn is the parent object of the news stories included in that channel.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy.

As a third example, a website, such as a social-networking website implemented by social-networking system 160, may also be arranged in a hierarchical structure for navigating the content of the social-networking website. In this context, the social-networking website may be a parent object whose child objects are the components (e.g., photo albums, user profile pages, etc.) of the website. For example, a photo album, while itself being a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, applications the user has added to the profile page, stories, songs the user has listened to, playlists. These various types of objects may all be children of the profile page, or may be further arranged into multiple levels. With some implementations, a user's profile page may include any number of sections, such as the user's education and employment information, the user's public "wall", or the user's social connections. Then the various types of objects above may be divided into specific sections.

In particular embodiments, an object 410 may be a component of a user interface. In this case, object hierarchy 400 may correspond to the user interface, and each object 410 may correspond to a specific component of the user-interface. A user interface may have various types of components, and this disclosure contemplates any applicable user-interface component types. For example, a user-interface component (i.e., an object 410) may be a window, a section, a tab, an image, a video, an audio, a text block, a menu, an icon, a button, a checkbox, a website, a web page, a frame, a clickable link, a message, a post, or an input field. In particular embodiments, an object 410 may be consumed by a user if the user is able to, for example and without limitation, interact with, view, read, listen to, manipulate, or handle the object 410. For example, some user-consumable objects 410 may be texts, images, videos, audios, feeds, executables (e.g., application programs or games), websites, web pages, digital books, photo albums, posts, or messages.

In particular embodiments, when the user interface corresponding to object hierarchy 400 is displayed (e.g., on a client system 130), the structure of the corresponding object hierarchy 400 may reflect the structure of the user interface. The relationships among the individual components in the user interface, as reflected in object hierarchy 400, may influence how these components are organized and presented to users. The user interface may have any number of layers, respectively corresponding to the individual levels of object hierarchy 400. Objects 410 (e.g., user-interface components) at a specific level of object hierarchy 400 are displayed in the corresponding layer of the user interface. With some implementations, the lowest or bottommost layer of the user interface corresponds to the first or topmost level of object hierarchy 400. Thus, root object 410A is displayed in the lowest layer of the user interface. Furthermore, in the user interface, each object 410 (e.g., user-interface component) is displayed in a layer immediately above the layer where its parent, if one exists, is displayed and immediately below the layer where its children, if any, are displayed. Sibling objects 410 are displayed at the same layer. Thus, the position of a component in the user interface indicates its relationships (e.g., parent-child or sibling) with other components in the user interface.

In particular embodiments, a user-interface component (e.g., an image, a video, a folder, etc.) may be displayed in various display modes. As an example, the user-interface component may be displayed in a "full-screen" mode, where the user-interface component occupies the entire or nearly the entire display area (e.g., the screen of an electronic device). As another example, the user-interface component may be displayed in an "on-page" mode, where the user-interface component is included in another user-interface component and displayed as a part of that other user-interface component (e.g., an image is displayed as a part of a web page). As a third example, the user-interface component may be displayed in an "index" mode, where the user-interface component is a part of a series of user-interface components (e.g., an image is displayed together with other images from the same album, or a chapter of a book is displayed in the table of content of the book together with other chapters from the same book).

In particular embodiments, a hierarchical user interface may be used to present content to a user. Such a user interface may be referred to as a "content feed" or "news feed" user interface. The content may be of any type and format, such as, for example and without limitation, text, icon, image, video, audio, web page, post, or message. This disclosure contemplates any applicable content type and format. In particular embodiments, the individual content items (e.g., text, image, video, audio, web page, post, message, news piece, etc.) may be organized into various categories, referred to as content sections. For example, related content items may be categorized into the same content section. The user interface may include any number of content sections, and each content section may include any number of content items. Hierarchically, a content section may be the parent of the content items belonging to that section. For example, various photos taken during a holiday trip may be organized into the same album, and various photo albums may be organized into the photo section of the user interface.

In particular embodiments, a user may consume or interact with a specific content item. For example, a user consumes a content item when the user scrolls, opens up, views, listens to, selects, reviews, or comments on the content item. A user interacts with a content item when the user selects, clicks on, taps, reviews, or comments on the content item. This disclosure contemplates any applicable means for a user to consume or interact with a content item.

In particular embodiments, a user interface may include any number of content sections, and each content section may include any number of content items. These content items may be of any type or format. When presenting and displaying these content items on an electronic device (e.g., a mobile device) for viewing by a user, the content sections may be arranged sequentially so that the user may go through these sections one at a time. Similarly, for each content section, the content items belonging to that section may also be arranged sequentially so that the user may go through these items one at a time.

This method of presenting content may be analogous to reading a book. A book may have a number of chapters, and each chapter may have a number of pages. When reading a book, a reader may start from the first page of the first chapter, and read one page at a time. When the reader reaches the last page of the first chapter, the reader may then moves on to the first page of the second chapter. And so on. Here, a chapter of the book may be analogous to a content section, and a page of a chapter may be analogous to a content item belonging to a specific content section. Of course, at any time while reading the book, the reader may go back to a previous page, or jump to a specific page anywhere in the book. Similarly, when viewing the content items, the user may go back and forth along content items arranged and displayed in a series.

In particular embodiments, when a series of content items is displayed on an electronic device, a user may scroll back and forth through the content items. As an example, the content items may be displayed on the screen of an electronic device one at a time. Suppose that the screen is touch-sensitive. In this case, the user may scroll through the content items by swiping a finger in the left or right direction horizontally across the touchscreen. For example, swiping a finger in the left direction may cause the content items to move toward the left, and swiping a finger in the right direction may cause the content items to move toward the right.

Figure 5C:
FIGS. 5A-5C illustrate scrolling through a series of content items.
Figure 5B:
Figure 5A:
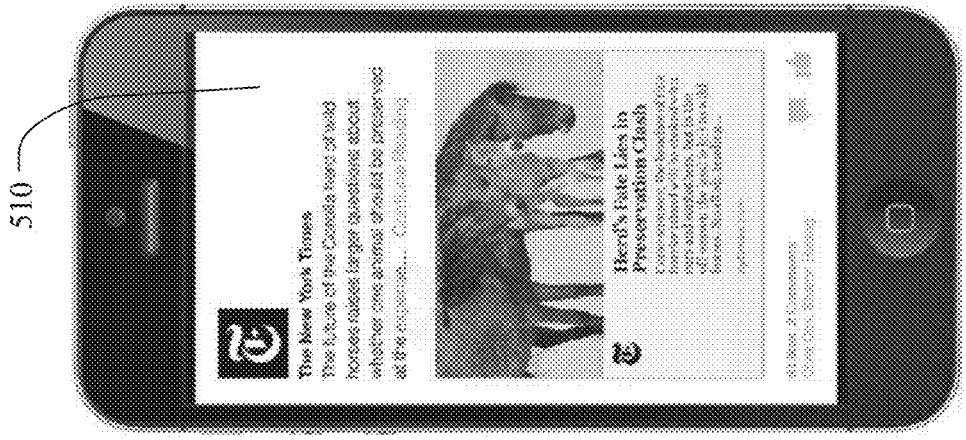

To further illustrate, in FIG. 5A, a content item 510 is currently displayed on the touchscreen of a Smartphone. Note that a content item may include other content items, as in the case of content item 510 where an image is included in a web page. As a user swipes a finger in the left direction horizontally across the touchscreen, it causes content item 510 to gradually move toward the left of the screen, corresponding to the movement of the user's finger, as illustrated in FIG. 5B. At the same time, the next content item in the series, content item 520, gradually moves onto the screen, also illustrated in FIG. 5B. If the user continues to swipe the finger in the left direction, then eventually, content item 510 shall move completely off the screen, and content item 520 shall move completely onto the screen, as illustrated in FIG. 5C. At this point, content item 520 has replaced content item 510 as the content item that is currently displayed to the user.

To go back to content item 510 (i.e., the previous content item before the currently displayed content item 520), the user may swipe a finger in the right direction horizontally across the touchscreen. To go to the next content item after the currently displayed content item 520, the user may swipe a finger in the left direction horizontally across the touchscreen. Note that each content item 510, 520 is analogous to a page of a book.

With a book, the total number of pages in each chapter is fixed and does not change. In contrast, with a user interface, the total number of content items in each content section may change from time to time since a user interface is a dynamic object. New content items may be added to a content section or existing content items may be deleted from a content section. For example, suppose that there is a content section for news feeds, and the content items in this news feeds section are news posts. As new news posts become available, they may be added to the news feeds section accordingly.

In particular embodiments, the content items are displayed on an electronic device (e.g., a client system 130) for presentation to a user of the device. However, these content items may come from various sources (e.g., the Internet, servers associated with social-networking system 160). The content items may be downloaded to the user's electronic device (e.g., over network 110) before they are displayed on the device.

Since each content section potentially has a great number of content items, it is impractical as well as may be unnecessary to download all the content items of all the content sections to the user's device at once. For example, in the case of the news feeds section, the news posts in the section may be arranged in reverse chronological order, with the newest news posts positioned toward the beginning of the series. Often, a user is only interested in the most recent news posts. News posts from a month or even a year ago probably have little concern or relevance to the user. Thus, it is not necessary to download all the news posts to the user's device. Instead, it is probably sufficient to download the first several news posts (e.g., the news posts from the past 24 hours) for presentation to the user. The older news posts may be downloaded if and when the user requests them.

Even when many content items of a specific content section have already been downloaded to the user's device and thus available for display, often, it is not necessary to display all of them initially. Again, consider the example of the news feeds section. Suppose that 50 most recent news posts in the section have already been downloaded to the user's device. If all 50 news posts are displayed initially, to scroll through the news feeds section (e.g., in order to reach the next or previous content section), the user must scroll through 50 news posts, which may take a long time and thus be annoying to the user. Instead, it is better to display a small number of available news posts (e.g., 5 news posts) initially. If the user wishes to read more news posts, additional news posts may then be displayed. Otherwise, the user can quickly scroll through the 5 news posts displayed initially for the news feeds section and move onto the next content section.

Figure 6:
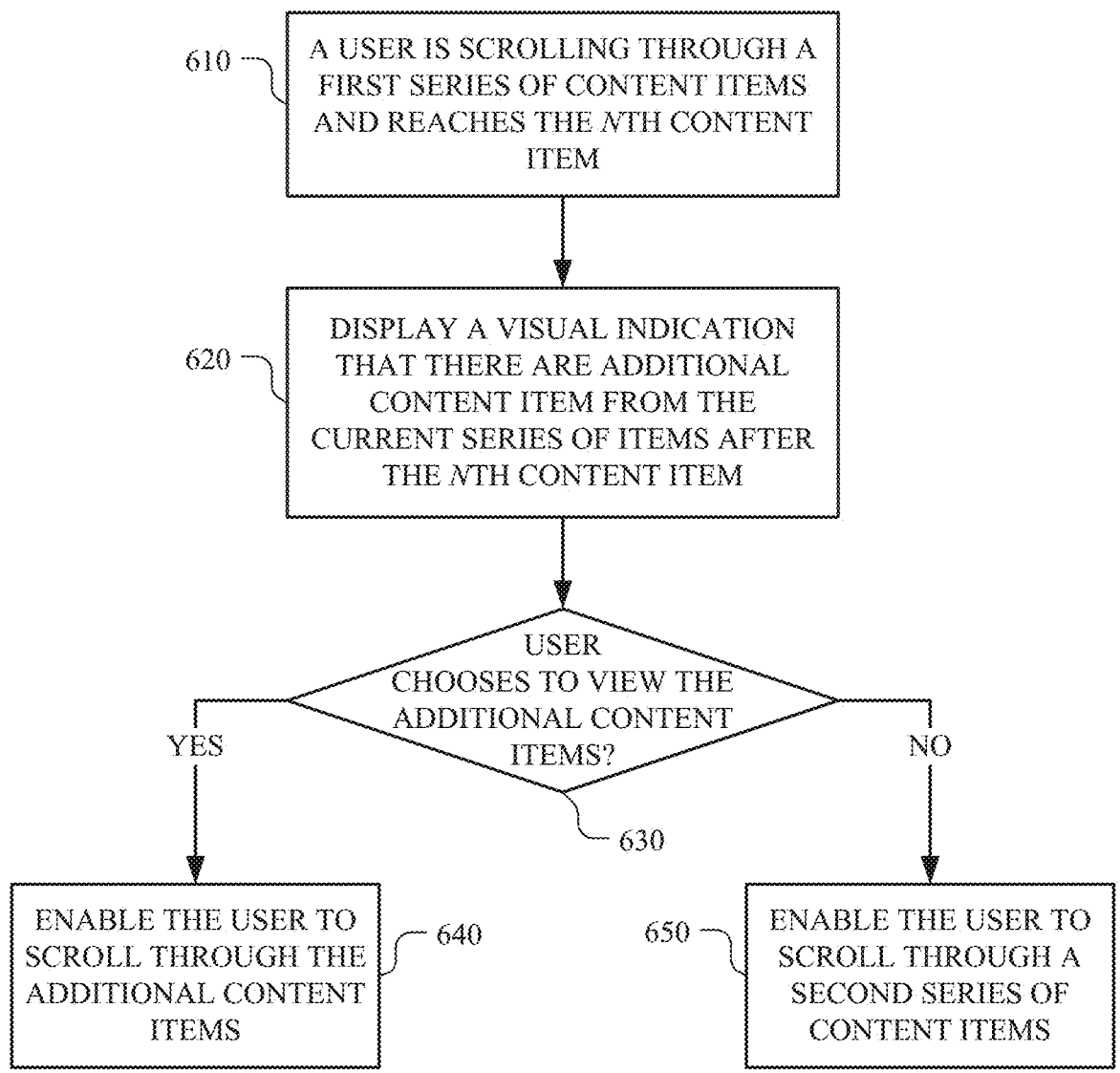
FIG. 6 illustrates an example method for presenting content on an electronic device.

Suppose that there are a number of content sections arranged sequentially, and each content section has a number of content items arranged sequentially. A user may scroll back and forth through the content sections one section at a time, and within each content section, the user may scroll back and forth through the content items one item at a time. FIG. 6 illustrates an example method 600 for presenting content items on an electronic device for viewing by a user.

Method 600 may begin at STEP 610, where a user is scrolling through a first series of content items in the forward direction (e.g., by swiping a finger toward the left across a touchscreen). This first series of content items may belong to a first content section. By scrolling through this first series of content items, the content items may be displayed on the screen sequentially, one item at a time.

Suppose that the user eventually reaches the nth content item from the first series of content items. For example, n may be a number between 5 and 10. At this point, although there are still additional content items from the current first series (i.e., from the first content section) after the nth content item available, instead of immediately letting the user scroll through the additional content items after the nth content item, at STEP 620, a visual indication is displayed, which indicates to the user that there are additional content items after the nth content item from the first series that are available and can be displayed if the user wants to view them.

At STEP 630, the user is given the option of choosing whether to view the additional content items after the nth content item from the current first series or go to a second content section (e.g., the content section after the current first content section) and view a second series of content items belonging to the second content section.

At STEP 640, if the user chooses to view the additional content items after the nth content item from the first series, the additional content items from the first series are displayed so that the user can scroll through them.

With some implementations, the user is able to scroll through another n content items from the first series. When the user reaches the 2nth content item from the first series, the user is asked again whether to view additional content items from the current first content section or go to the second content section. This process may be similarly repeated while the user scrolls through the series of content items from the current content section.

Otherwise, at STEP 650, if the user chooses to go to the second content section after the first content section, the second series of content items are displayed so that the user can scroll through them.

Note that the user is able to scroll back and forth through the content items. In the forward direction, when the user reaches the last content item from the current content section that the user wishes to view, further scrolling in the forward direction causes the first content item from the next content section to be displayed and so on. In the backward direction, when the user reaches the first content item from the current content section, further scrolling in the backward direction causes the last content item from the previous content section to be displayed and so on.

Figure 7C:
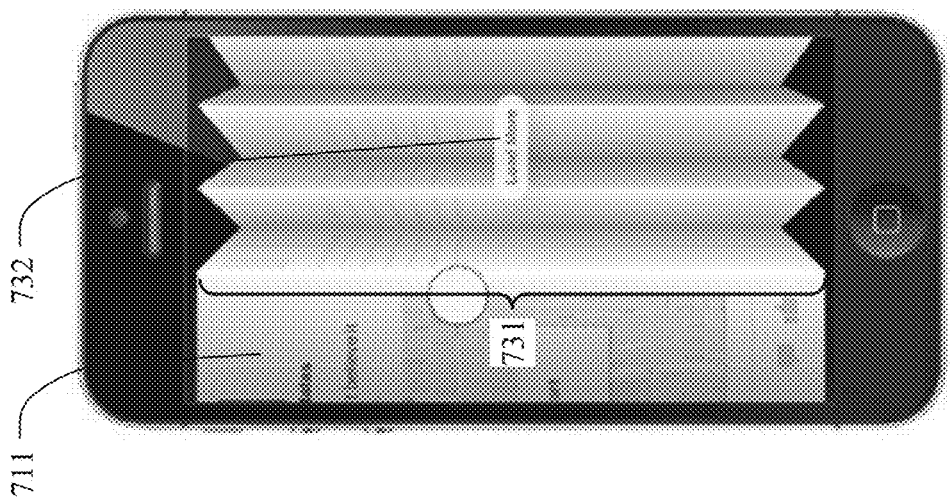
FIGS. 7A-7I illustrate an example for presenting content on an electronic device.
Figure 7B:
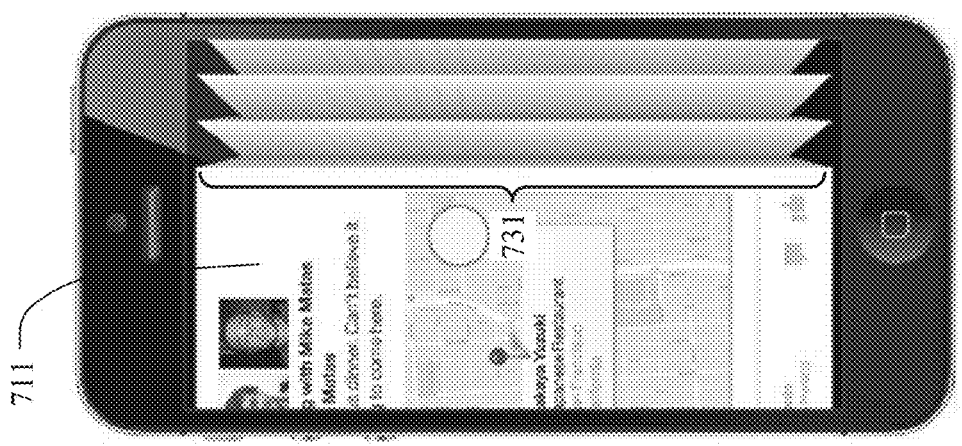
Figure 7A:
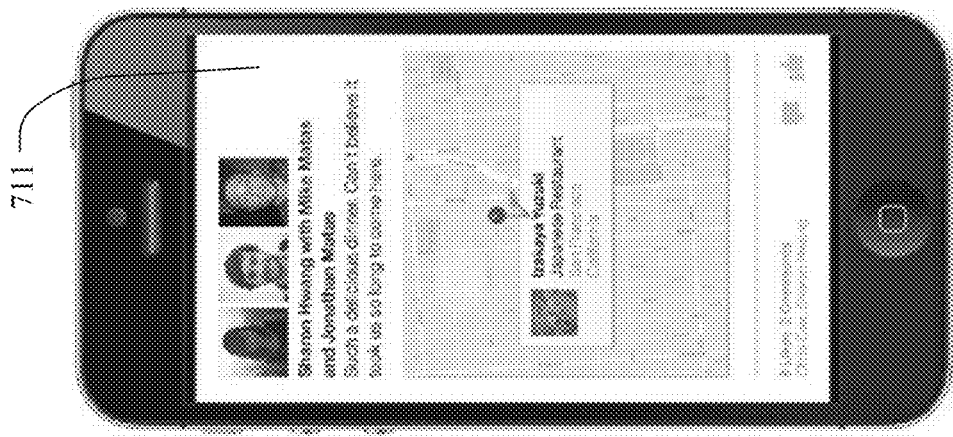
Figure 7F:
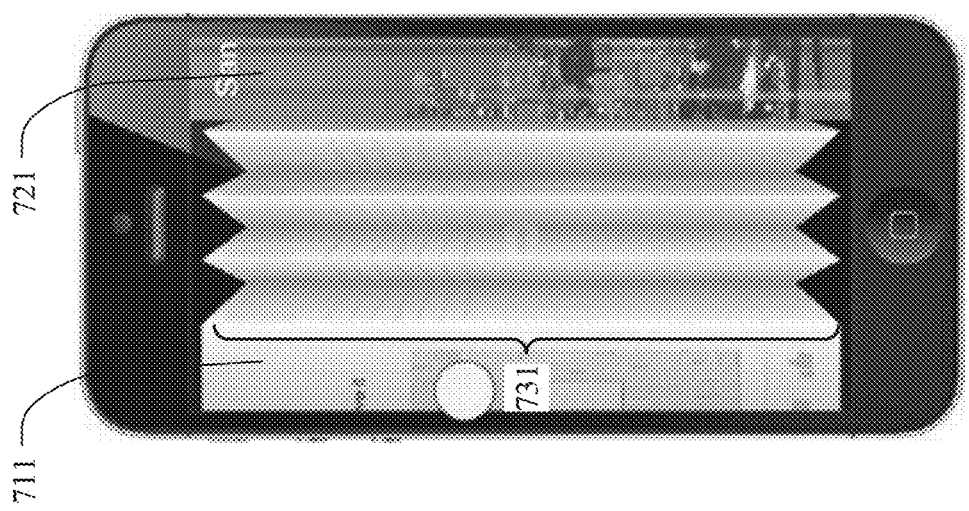

To further explain the steps of FIG. 6, consider an example illustrated in FIGS. 7A-7I. In FIG. 7A, a content item 711 is shown on the screen of a Smartphone. Suppose that a user has been scrolling through a first series of content items, and content item 711 is the nth item in the current series. Thus, in FIG. 7A, the user has reached the nth content item (i.e., content item 711) in the current series.

Further suppose that the user continues to swipe a finger toward the left of the screen, which means that the user continues to scroll toward the right in the current first series of content items. In FIG. 7B, content item 711 gradually moves toward the left of the screen, corresponding to the swiping movement of the user's finger. However, since content item 711 is the nth item in the current first series, instead of displaying the next content item in the current series after content item 711 (i.e., the (n+1)th item in the current series), a visual indication 731 is shown. In this example, visual indication 731 visually resembles a stack of folded paper. In fact, in this example, a series of content items visually resembles a long scroll of paper folded page by page at each page's edge. Each content item then visually resembles a specific page in the scroll. Visual indication 731 suggests to the user that there are more content items in the current first series that can be viewed, if the user so chooses.

As the user continues to swipe a finger toward the left of the screen, in FIG. 7C, content item 711 moves further to the left and off the screen. At the same time, visual indication 711, which resembles a stack of folded paper, unfolds somewhat. In addition, a button 732 appears. Button 732 enables the user to choose to view more content items from the current series (i.e., those content items coming after content item 711) by, for example, clicking on button 732.

In particular embodiments, button 732 appears once the user's finger has moved across the screen for a threshold distance. For example, the threshold distance may be two-thirds or one-half of the width of the screen. Thus, in FIG.

7C, as the user's finger swipes toward the left and reaches about the left one-third part of the screen, button 732 appears.

Suppose that the user has clicked on button 732 to view more content items from the current series. In this case, in FIG. 7D, content item 711 continues to move off the screen. At the same time, visual indication 731, which resembles a stack of folded paper, continues to unfold so that the next content item 712 after content item 711 from the current first series begins to appear.

Figure 7E:
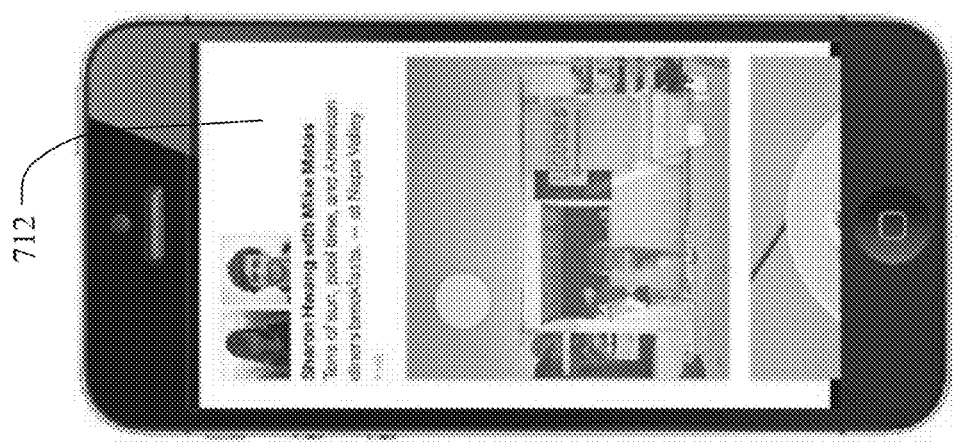
Figure 7D:
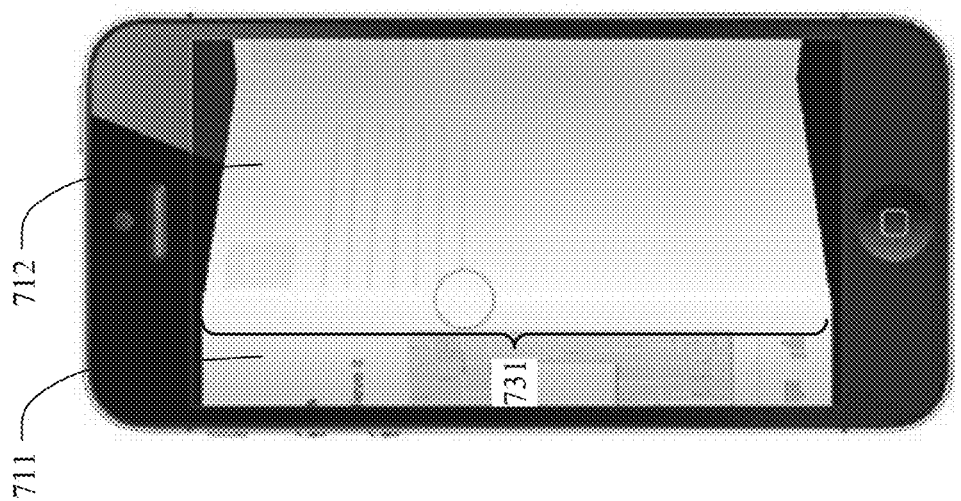

Eventually, in FIG. 7E, content item 712 is completely displayed on the screen. From here, the user may continue to scroll along the current first series of content items. In some embodiments, after the user scrolls through another n content items from the current first series, the user is again given the option of choosing whether to continue scrolling through the current series of content items, as illustrated in FIGS. 7B-7D. In fact, this process may be similarly repeated for every n content items.

On the other hand, suppose that from FIG. 7C, the user does not click on button 732. Instead, the user continues to swipe the finger toward the left of the screen. This indicates that the user does not wish to view additional content items, after content item 711, from the current first series. As the user's finger reaches near the left edge of the screen, in FIG. 7F, content item 711 continues to move off the screen. At the same time, the first content item 721 from the next second series of content items begins to appear.

Figure 7I:
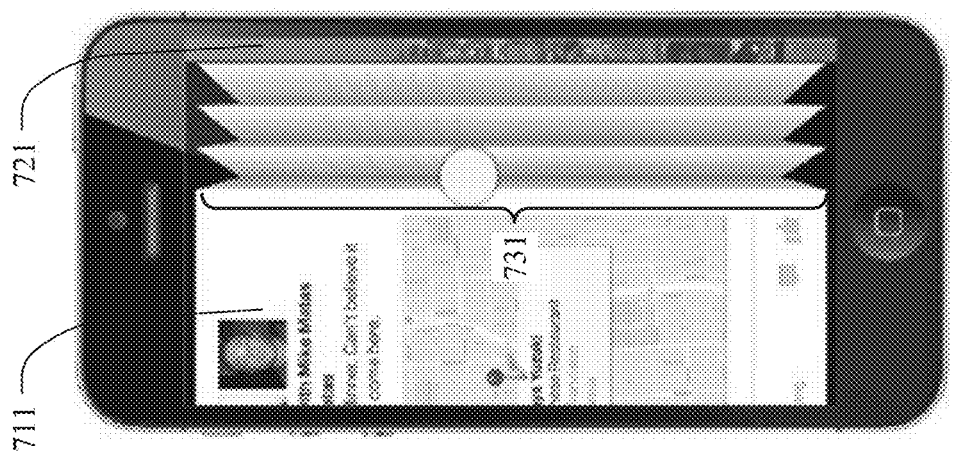
Figure 7H:
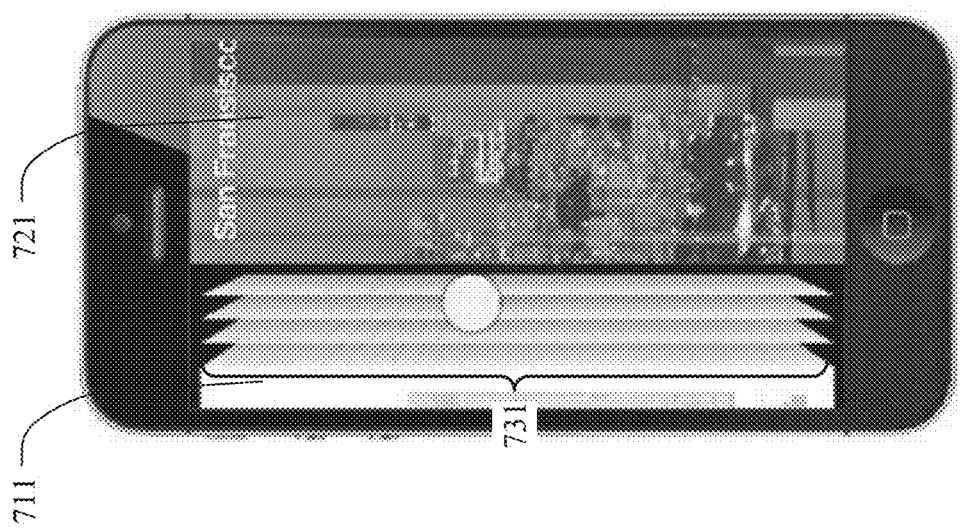
Figure 7G:
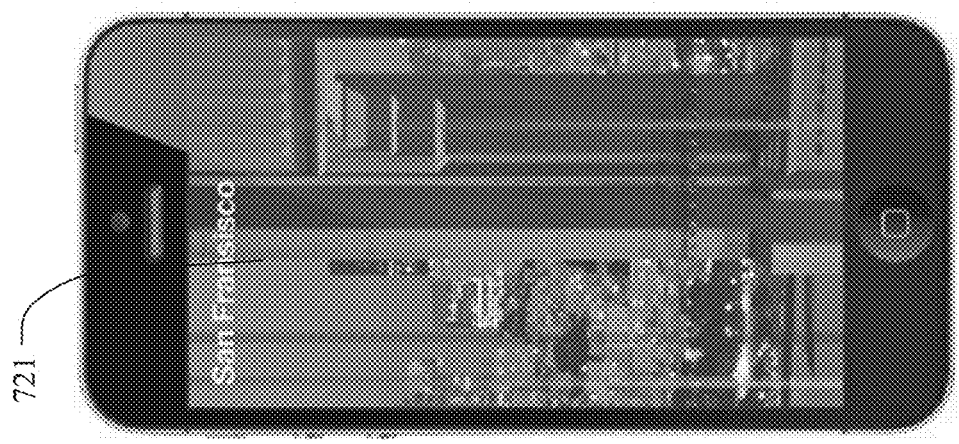

If the user continues to scroll forward by swiping a finger in the left direction across the touchscreen, eventually, in FIG. 7G, content item 721 is completely displayed on the screen. From here, the user may continue to scroll along the second series of content items, which is now the current series. After the user reaches the nth content item from the second series, the user may be similarly given the option of choosing whether to continue scrolling through the second series of content items to view more content items after the nth content item or to go to the third series of content items after the second series.

Of course, a user may scroll through each series of content items in both the forward and backward directions. To scroll in the backward direction, the user may swipe a finger in the right direction across the touchscreen. Suppose that the user now scrolls backward. In FIG. 7H, as the user reaches the content item 721, which is the first content item of the second series, if the user continues to scroll backward, visual indication 731 appears, followed by content item 711, which is the nth content item from the first series. Here, visual indication 731 also marks the boundary between two consecutive series of content items, indicating where one series ends and the next series begins.

If the user continues to scroll backward, in FIG. 7I, content item 721 gradually moves off the screen, while content item 711 gradually moves onto the screen. Eventually, content item 711 is displayed on the screen completely. At this point, the user has returned to the first series, which becomes the current series.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 8:
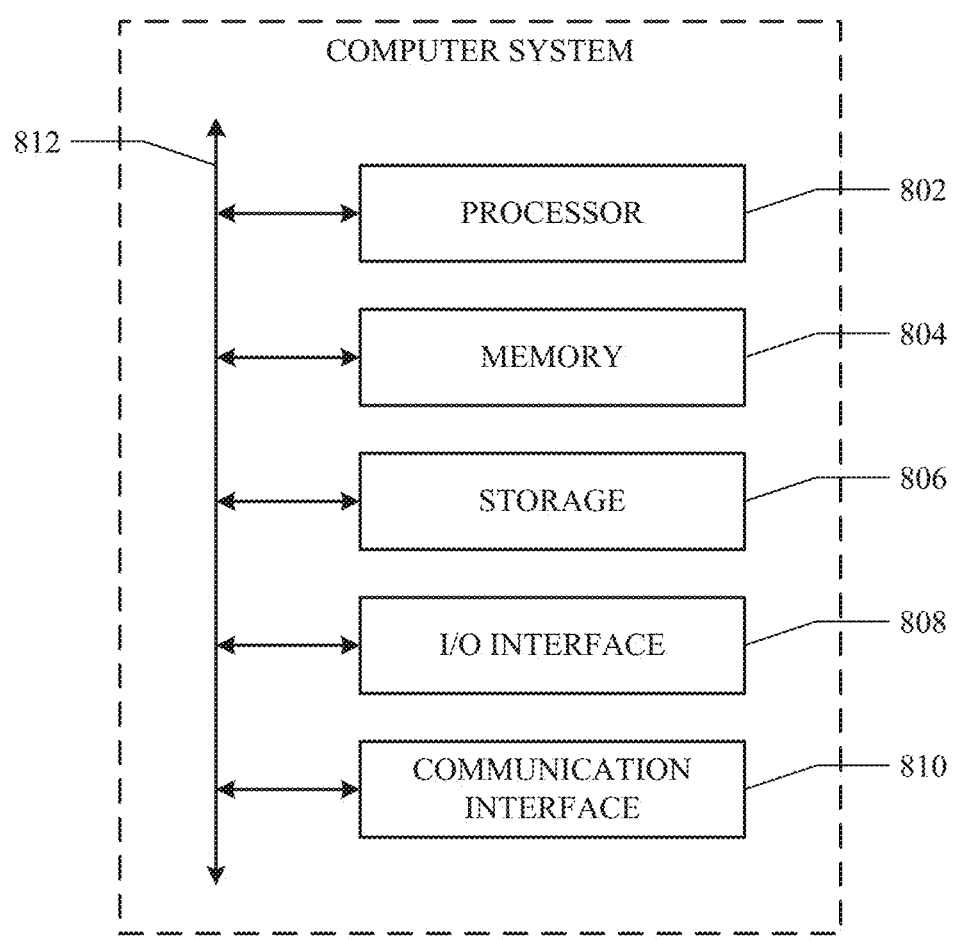
FIG. 8 illustrates an example computer system.

The method illustrated in FIG. 6 may be implemented as computer software and executed on a computer system. FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a client computing device:
    downloading, from a plurality of content items associated with a plurality of content categories, a first set of content items associated with a first content category;
    displaying the first set of content items on a respective first set of pages on a user interface of the client computing device, wherein each page of the first set of pages is connected at an edge to another page in the first set of pages, and wherein each page substantially fills the user interface;
    receiving a first user input to scroll in a forward direction through the first set of pages;
    displaying, responsive to reaching a last page of the first set of pages, a graphical interactive element that indicates that additional content items associated with the first content category are available to be downloaded and displayed, the graphical interactive element overlaying a portion of a visual indication illustrating a stack of folded paper comprising a second set of pages, wherein each page of the second set of pages is connected at an edge to another page of the second set of pages;
    receiving a second user input selecting the graphical interactive element;
    downloading, responsive to the second user input selecting the graphical interactive element, from the plurality of content items, a second set of content items associated with the first content category; and
    displaying the second set of content items on the second set of pages on the user interface, respectively, wherein displaying the second set of content items comprises displaying an animation of the stack of folded paper expanding into view until a first page of the second set of pages substantially fills the user interface.

2. The method of claim 1, wherein the downloading of the first set of content items associated with the first content category further comprises downloading a set of other content items associated with a second content category.

3. The method of claim 1, wherein the last page of the first set of pages is connected at an edge to the visual indication representing the stack of folded paper.

4. The method of claim 1, wherein the last page of the first set of pages is reached after the user scrolls in the forward direction for a threshold distance greater than a predetermined distance.

5. The method of claim 1, further comprising:
    receiving a third user input to scroll in a forward direction through the second set of pages; and
    displaying, responsive to reaching a last page of the second set of pages, the graphical interactive element that indicates that additional content items associated with the first content category are available to be downloaded and displayed.

6. The method of claim 1, wherein the graphical interactive element comprises a user-interactive button.

7. One or more computer-readable non-transitory storage media embodying software that is operable when executed to:
    download, at a client computing device, from a plurality of content items associated with a plurality of content categories, a first set of content items associated with a first content category;
    display the first set of content items on a respective first set of pages on a user interface of the client computing device, wherein each page of the first set of pages is connected at an edge to another page in the first set of pages, and wherein each page substantially fills the user interface;

receive a first user input to scroll in a forward direction through the first set of pages;

display, responsive to reaching a last page of the first set of pages, a graphical interactive element that indicates that additional content items associated with the first content category are available to be downloaded and displayed, the graphical interactive element overlaying a portion of a visual indication illustrating a stack of folded paper comprising a second set of pages, wherein each page of the second set of pages is connected at an edge to another page of the second set of pages;

receive a second user input selecting the graphical interactive element;

download, responsive to the second user input selecting the graphical interactive element, from the plurality of content items, a second set of content items associated with the first content category; and display the second set of content items on the second set of pages on the user interface, respectively, wherein displaying the second set of content items comprises displaying an animation of the stack of folded paper expanding into view until a first page of the second set of pages substantially fills the user interface.

8. The media of claim 7, wherein the downloading of the first set of content items associated with the first content category further comprises downloading a set of other content items associated with a second content category.

9. The media of claim 7, wherein the last page of the first set of pages is connected at an edge to the visual indication representing the stack of folded paper.

10. The media of claim 7, wherein the last page of the first set of pages is reached after the user scrolls in the forward direction for a threshold distance greater than a predetermined distance.

11. The media of claim 7, wherein the software is further operable when executed to:

receive a third user input to scroll in a forward direction through the second set of pages; and display, responsive to reaching a last page of the second set of pages, graphical interactive element that indicates that additional content items associated with the first content category are available to be downloaded and displayed.

12. The media of claim 7, wherein the graphical interactive element comprises a user-interactive button.

13. A system comprising: one or more processors; and a memory coupled to the processors comprising instructions executable by the processors, the processors operable when executing the instructions to:

download, at a client computing device, from a plurality of content items associated with a plurality of content categories, a first set of content items associated with a first content category;

display the first set of content items on a respective first set of pages on a user interface of the client computing device, wherein each page of the first set of pages is connected at an edge to another page in the first set of pages, and wherein each page substantially fills the user interface;

receive a first user input to scroll in a forward direction through the first set of pages;

display, responsive to reaching a last page of the first set of pages, a graphical interactive element that indicates that additional content items associated with the first content category are available to be downloaded and displayed, the graphical interactive element overlaying a portion of a visual indication illustrating a stack of folded paper comprising a second set of pages, wherein each page of the second set of pages is connected at an edge to another page of the second set of pages;

receive a second user input selecting the graphical interactive element;

download, responsive to the second user input selecting the graphical interactive element, from the plurality of content items, a second set of content items associated with the first content category; and display the second set of content items on the second set of pages on the user interface, respectively, wherein displaying the second set of content items comprises displaying an animation of the stack of folded paper expanding into view until a first page of the second set of pages substantially fills the user interface.

14. The system of claim 13, wherein the downloading of the first set of content items associated with the first content category further comprises downloading a set of other content items associated with a second content category.

15. The system of claim 13, wherein the last page of the first set of pages is connected at an edge to the visual indication representing the stack of folded paper.

16. The system of claim 13, wherein the last page of the first set of pages is reached after the user scrolls in the forward direction for a threshold distance greater than a predetermined distance.

17. The system of claim 13, wherein the processors are further operable when executing the instructions to:

receive a third user input to scroll in a forward direction through the second set of pages, and display, responsive to reaching a last page of the second set of pages, the graphical interactive element that indicates that additional content items associated with the first content category are available to be downloaded and displayed.

18. The system of claim 13, wherein the graphical interactive element comprises a user-interactive button.

* * * * *